(12) United States Patent
Aritomi

(10) Patent No.: US 7,679,759 B2
(45) Date of Patent: Mar. 16, 2010

(54) TEST PRINTING FOR TAB PAPER

(75) Inventor: Masanori Aritomi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 146 days.

(21) Appl. No.: 11/877,665

(22) Filed: Oct. 23, 2007

(65) Prior Publication Data
US 2009/0009552 A1  Jan. 8, 2009

Related U.S. Application Data

(62) Division of application No. 10/120,355, filed on Apr. 12, 2002, now Pat. No. 7,307,751.

(30) Foreign Application Priority Data

Apr. 19, 2001  (JP)  ............... 2001-121505
Apr. 2, 2002  (JP)  ............... 2002-100119

(51) Int. Cl.
*G06F 3/12* (2006.01)
*G06K 15/02* (2006.01)
*H04N 1/00* (2006.01)
*H04N 1/21* (2006.01)
*H04N 1/387* (2006.01)
*H04N 1/23* (2006.01)
*H04N 1/393* (2006.01)

(52) U.S. Cl. ............... 358/1.13; 358/1.6; 358/1.16; 358/1.18; 358/296; 358/451; 358/452; 358/453

(58) Field of Classification Search ............ None
See application file for complete search history.

(56) References Cited

U.S. PATENT DOCUMENTS

| 4,679,153 | A | | 7/1987 | Robinson et al. |
| 5,133,048 | A | | 7/1992 | Parsons et al. |
| 5,210,622 | A | | 5/1993 | Kelley et al. |
| 5,337,161 | A | | 8/1994 | Hube |
| 5,519,501 | A | * | 5/1996 | Hamilton ............ 358/296 |
| 5,655,207 | A | | 8/1997 | Sugiyama et al. |

(Continued)

FOREIGN PATENT DOCUMENTS

EP   0479494   4/1992

(Continued)

*Primary Examiner*—Twyler L Haskins
*Assistant Examiner*—Myles D Robinson
(74) *Attorney, Agent, or Firm*—Fitzpatrick, Cella, Harper & Scinto

(57) ABSTRACT

A mechanism for performing tab paper printing and test printing by simple operation is provided. A printer performs a print process with an image formation position unshifted in the test printing and a print process with the image formation position shifted in the tab paper printing. In case of performing the tab paper printing after the test printing, the printing is performed by using print data already held in the printer or a host computer. It structured to enable to output to a plain paper a print result in which a decoration is added only to a tab position correspondence portion, enable to change its decoration method, and enable easy discrimination of the position. By the above structure, a user can easily correct the position of the content intended to be printed on a tab, and costs necessary for the tab paper used in the test can be reduced.

3 Claims, 16 Drawing Sheets

U.S. PATENT DOCUMENTS

| | | |
|---|---|---|
| 6,160,629 A | 12/2000 | Tang et al. |
| 6,163,784 A | 12/2000 | Taguchi |
| 6,393,232 B1 | 5/2002 | Osari et al. |
| 6,782,218 B2 | 8/2004 | Sekiguchi et al. |
| 6,890,111 B2 | 5/2005 | Kujirai |
| 7,258,497 B2 | 8/2007 | Kujirai |
| 7,317,551 B2 * | 1/2008 | Masaki ...................... 358/1.18 |
| 2001/0044868 A1 | 11/2001 | Roztocil et al. |
| 2003/0026626 A1 | 2/2003 | Sunada et al. |
| 2008/0219690 A1 * | 9/2008 | Ono ............................ 399/82 |

FOREIGN PATENT DOCUMENTS

| | | |
|---|---|---|
| JP | 2001106418 | 4/2001 |
| WO | 0125100 | 4/2001 |
| WO | 0165912 | 9/2001 |

* cited by examiner

TEST PRINTING FOR TAB PAPER

This application is a divisional application of application Ser. No. 10/120,355, now allowed as U.S. Pat. No. 7,307,751, filed Apr. 12, 2002, which is incorporated herein by reference.

BACKGROUND OF THE INVENTION

1. Field of the Invention

The present invention relates to a print control apparatus which performs print output to a tab paper on the basis of print data transmitted from an information processing apparatus, the information processing apparatus, a print control method, a control method of the information processing apparatus, and programs.

2. Related Background Art

In recent years, a system which is constructed by a host computer and a printer connected through an interface (e.g., Centronics interface or the like) is known as a data processing system. In this system, output information input from the host computer is analyzed on the printer side, the analyzed data is expanded into bit map data as the output data to a printer engine such as a laser beam printer, and a laser beam modulated based on the expanded data is scanning-exposed to a photosensitive drum, whereby image recording is performed.

In a case where the printer side has an emulation function, this system is structured to be able to process plural printer control language systems, and perform a print process as switching an emulation mode and a native mode according to an application to be executed by a user. Therefore, a switch for switching or changing the printer control language and a card slot for instructing the switching and the like have been previously provided on the printer.

Conventionally, a processing method in case of performing tab printing by the printer of such a system is executed as follows:

the tab printing is set from an UI (user interface) or a panel of the printer driver;

a tab width (position) is determined by the printer; and a page to be printed is shifted in its width direction by the tab width, and then the printing is instructed.

Thus, the user has to create document data as being conscious of the tab width and the paper feed direction. However, since the number of tabs, the tab position, the height of the tab width, and the like are respectively various according to a kind of tab paper, it is difficult for the user to imagine actual printed results. Therefore, it is necessary to perform (test) printing to the tab paper and then process the document data according to the result of the test printing.

Therefore, in such a conventional example, there are following problems.

(1) The user has to be conscious of the tab width and the paper feed direction.

(2) It is necessary to recognize a correspondence between the data to be created and the physical areas such as the number of tabs, the tab position, the height of the tab width, and the like being respectively various according to the kind of tab paper.

(3) The (test) printing to the tab paper and corrections of documents are repeated.

(4) The tab paper is wasted for the test printing.

Further, in a case where the user creates the document for the tab paper by using the application on the host computer and then causes the printer to print the created document as a test, it is conceivable that the user does not designate a media type as the tab paper but designates it as a plain paper on the UI of the printer driver, and then causes the printer to perform the print process. However, with respect to the print data which is generated by the printer driver under such designation, the media type has been designated as the plain paper. Therefore, in a case where the print data is stored beforehand in a memory box such as a hard disk or the like of the printer and then it is instructed from an operation panel of the printer to print-output the stored print data, the media type is surely the plain paper. Thus, even if the user wishes the tab paper printing after completion of the test printing, it is impossible to perform the tab paper printing. That is, to perform the tab paper printing, it is necessary to again transmit, from the host computer, the print data in which the media type has been designated as the tab paper.

Further, in a case where the print process to the tab paper is performed after the test printing, it is necessary to again instruct the printing from the application of the information processing apparatus. Thus, loads of resources of the information processing apparatus and loads of user's operations increase, whereby a problem on usability occurs.

SUMMARY OF THE INVENTION

The present invention has been thus made to solve the above problems, and the subject of the present invention is to provide a print control apparatus, an information processing apparatus, a print control method, a control method of the information processing apparatus, and programs, by which printing to a tab paper and corrections of print data need not be repeated.

Further, an object of the present invention is to provide a mechanism that print data is stored in a memory box of a print control apparatus, test printing of the print data is performed, and after then tab paper printing is correctly performed.

Furthermore, an object of the present invention is to provide a mechanism that test printing can be performed so that an area corresponding to a tab position of a tab paper is distinguishable.

Furthermore, an object of the present invention is to provide a mechanism that, when printing to a tab paper is performed after test printing, loads of user's operations can be decreased, and a desirable printed result can be obtained by simple operation.

In order to achieve the above objects, the present invention provides a print control apparatus which controls print output to a tab paper on the basis of print data transmitted from an information processing apparatus, comprising: an analysis means for analyzing the print data; a shift print control means for performing print control by shifting an image formation position, in a case where it is analyzed by the analysis means that designation of the tab paper is included in the print data; and a test print control means for performing print control without shifting the image formation position, in a case where it is analyzed by the analysis means that designation of test printing is included in the print data.

Further, the present invention provides an information processing apparatus which generates print data to be transmitted to a print control apparatus performing print output to a tab paper, comprising: a generation means for generating the print data to perform test printing of tab paper printing; and a setting means for setting a decoration process to be performed to an area corresponding to a tab position, in a case where the test printing of the tab paper printing is performed, wherein the generation means generates the print data on the basis of the decoration process set by the setting means.

Furthermore, the present invention provides an information processing apparatus which generates print data to be transmitted to a print control apparatus performing print output to a tab paper, comprising: an obtaining means for obtaining print setting; a test data generation means for generating the print data to which the tab paper is not designated as a media type, in a case where the tab paper is designated and test printing is designated in the print setting obtained by the obtaining means; and a tab paper data generation means for generating the print data to which the tab paper is designated as the media type, in a case where the tab paper is designated and the test printing is not designated in the print setting obtained by the obtaining means.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Hereinafter, the embodiments of the present invention will be explained with reference to the attached drawings.

First, before explanation of the structure shown in the embodiment, a structure of a laser beam printer which is suitable for a print control apparatus according to the embodiment of the present invention will be explained with reference to FIGS. 1 to 3. Incidentally, the printer to which the embodiment is applicable is not limited to the laser beam printer or a later-described ink-jet printer, that is, it is needless to say that a printer of another print system can be used.

Figure 1:
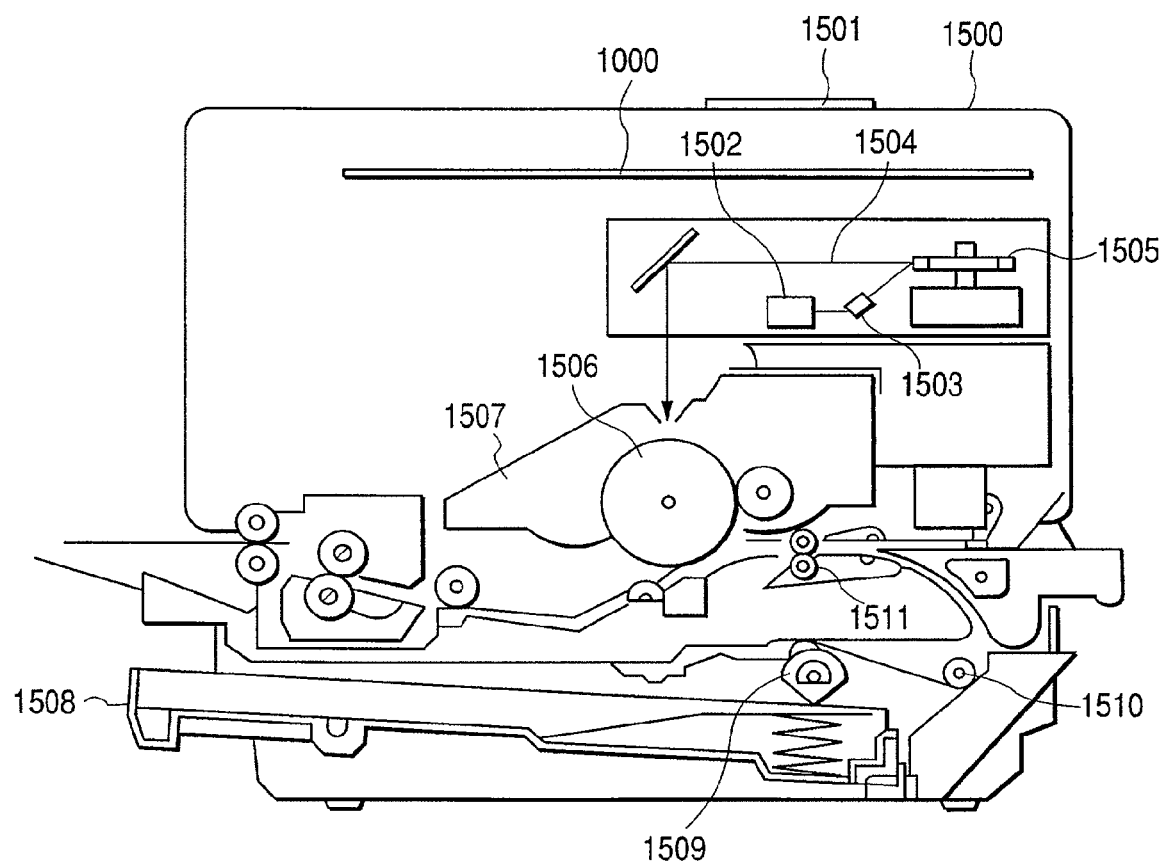
FIG. 1 is a side sectional view showing a structure of a laser beam printer (LBP) according to an embodiment.

FIG. 1 is a side sectional view showing the structure of the laser beam printer (LBP) according to the embodiment. In FIG. 1, numeral 1500 denotes the body of the LBP (called the LBP body). The LBP body 1500 inputs and stores print information (a character code and the like), form information, macroinstructions or the like supplied from an externally connected host computer (shown in FIG. 2), creates a character pattern, a form pattern or the like corresponding to the stored-information, and forms an image based on the created pattern on a recording paper or the like being a recording medium. Numeral 1501 denotes an operation unit on which various keys, switches, LED displays and the like operated and handled by an operator are disposed. Numeral 1000 denotes a printer control unit which controls the LBP body 1500 as a whole and analyzes character information and the like supplied from the host computer.

The printer control unit 1000 mainly converts the character information into a video signal of the corresponding character pattern, and then outputs the obtained signal to a laser driver 1502. The laser driver 1502 is the circuit which is to drive a semiconductor laser 1503, and controls switching of on/off of a laser beam 1504 irradiated from the semiconductor laser 1503 according to the input video signal. The laser beam 1504 is swung rightward and leftward by a rotating polyhedral mirror 1505 to perform scan and exposure on an electrostatic drum 1506, whereby an electrostatic latent image of the character pattern is formed on the electrostatic drum 1506. The formed electrostatic latent image is developed by a developing unit 1507 disposed around the electrostatic drum 1506, and then transferred to the recording paper.

A cut sheet is used as the recording paper. The cut sheets are held in a paper cassette 1508 installed in the LBP body 1500, taken in the body by a paper feed roller 1509 and transportation rollers 1510 and 1511, and supplied to the electrostatic drum 1506. Further, at least one or more not-shown card slot is disposed on the LBP body 1500 so that, in addition to built-in fonts, an option font card and a control card (i.e., an emulation card) of different language system can be connected to the body.

Figure 2:
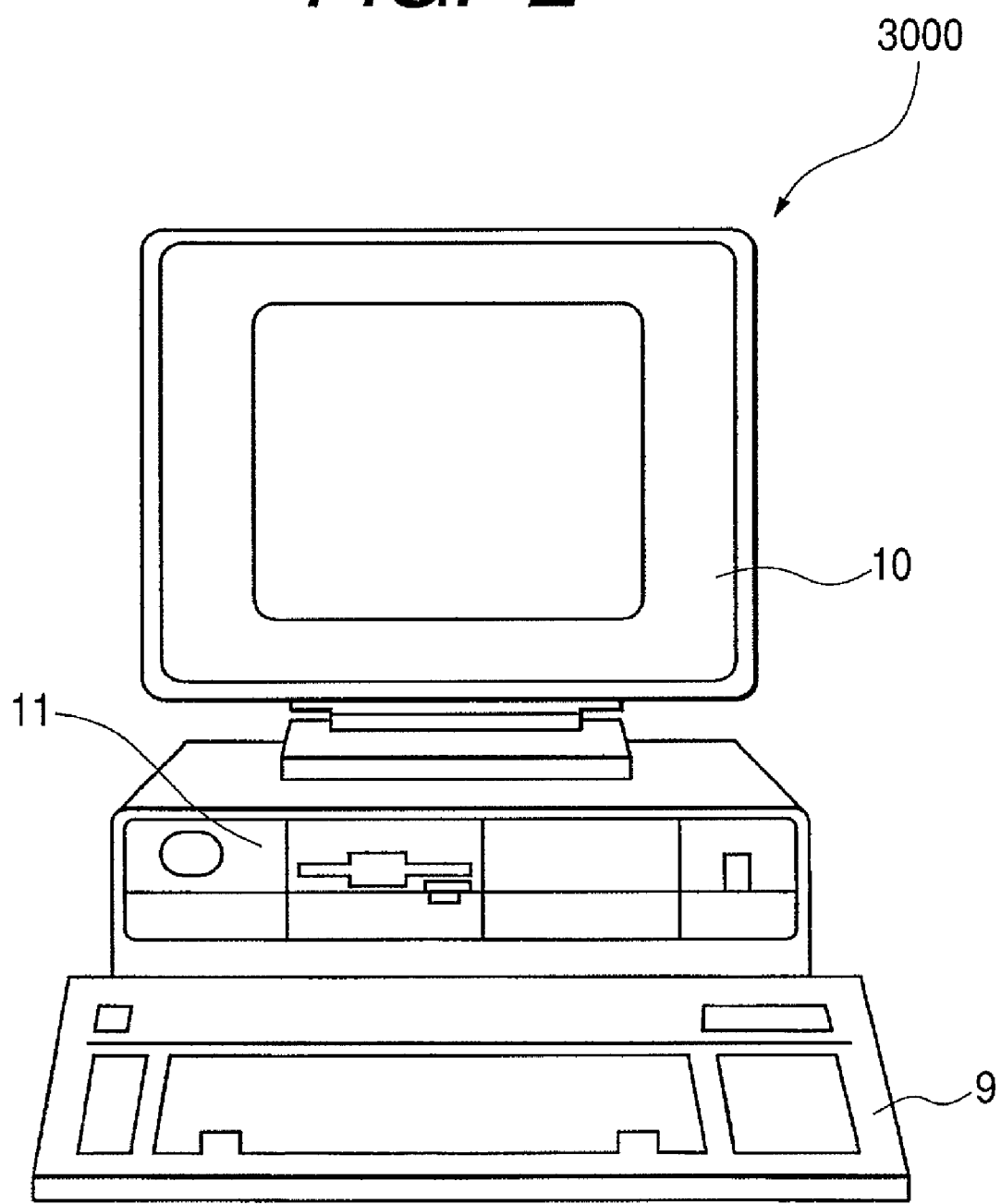
FIG. 2 is a view showing an external appearance of an information processing apparatus which is suitable to apply an output method of the embodiment.

FIG. 2 is a view showing the external appearance of the host computer which is suitable for the information processing apparatus according to the embodiment of the present invention. As shown in the drawing, a keyboard 9 by which inputs from a user are accepted, and a CRT display 10 which displays various outputs to the user are connected to an information processing apparatus (i.e., a host computer) 3000. Further, the host computer 3000 has an external memory 11 which stores applications, data, printer drivers and the like read to an internal RAM and thus executed under the control of an operating system (OS) of the host computer.

Figure 3:
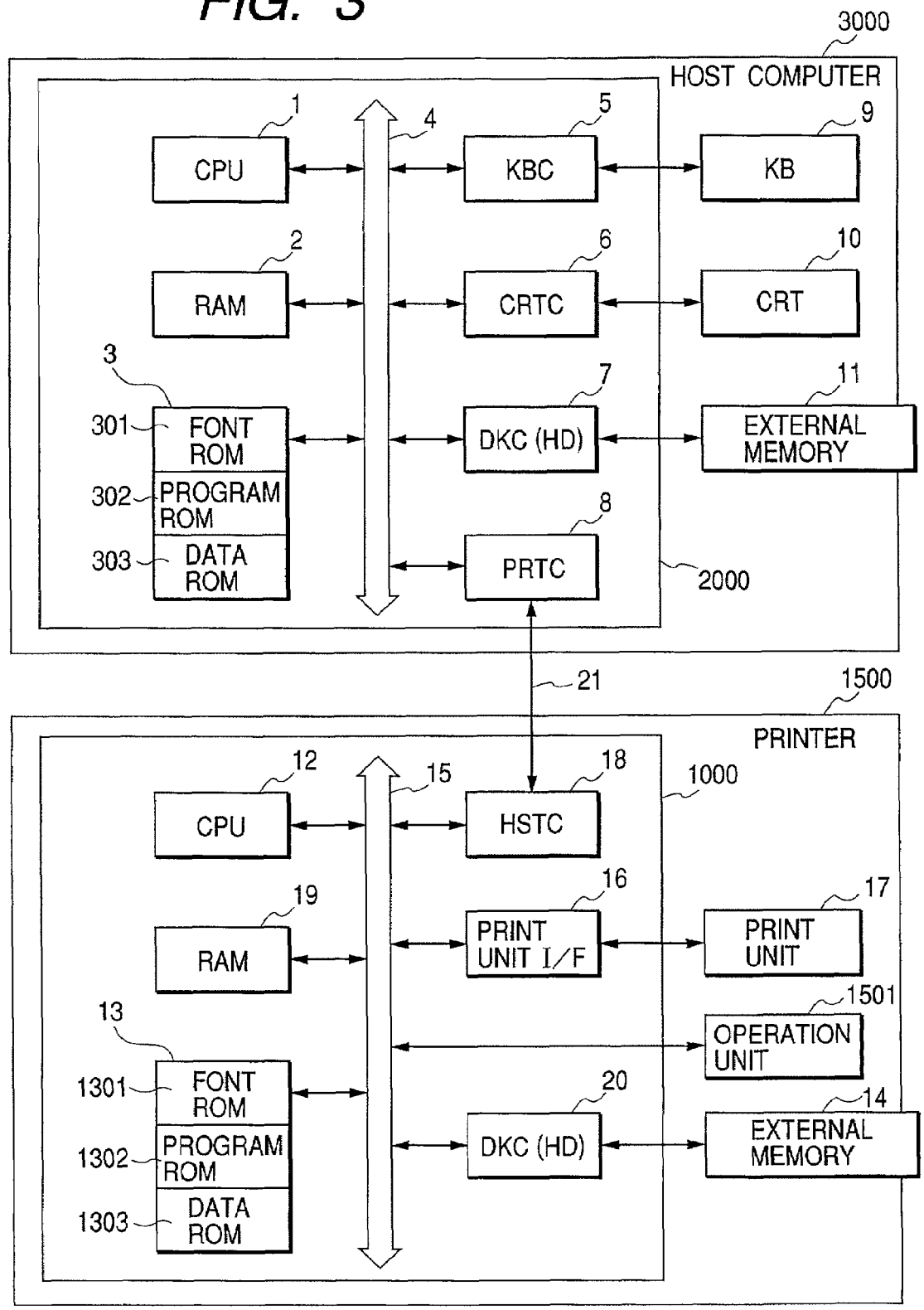
FIG. 3 is a block diagram showing a structure of an output system which is composed of a printer 1500 and a host computer 3000 according to the embodiment.

FIG. 3 is a block diagram showing the structure of an output system which is composed of the printer 1500 and the host computer 3000 according to the embodiment. It should be noted that an example of FIG. 3 shows the structure of a printer control unit 1000 in the printer 1500 and the structure of the host computer 3000 centrally.

Incidentally, if the functions in the embodiment can be executed, the present invention is applicable to a structure which is composed of a single apparatus, a system which is composed of plural apparatuses as in the embodiment, or a system in which processes are performed among plural apparatuses connected through a network such as a LAN or the like.

In FIG. 3, numeral 3000 denotes the host computer which includes a CPU 1. The CPU 1 executes a document (or text) process to mixedly handle figures, images, characters, tables (including spreadsheets or the like) and the like on the basis of a document processing program stored in a program ROM 302 of a ROM 3. Further, the CPU 1 collectively controls respective devices which are connected to a system bus 4 in a section 2000.

In the host computer 3000, the programs and the like which are to be executed by the CPU 1 are stored in the program ROM 302 of the ROM 3, font data and the like which are to generate the character pattern and the like to be displayed on the CRT display 10 from the document data edited or created when the document process is performed are stored in a font ROM 301 of the ROM 3, and various data (e.g., directory information, a printer driver table and the like) which are used when the document process, a display process and the like are performed are stored in a data ROM 303 of the ROM 3. Numeral 2 denotes a RAM which functions as a main memory to which control programs of the CPU 1 are downloaded, a working area which is used when various processes are executed, and the like.

It should be noted that the control program for the CPU 1 may be stored in the external memory 11 such as a floppy disk (FD), a CD-ROM, a DVD or the like and thus executed by the CPU 1.

Numeral 5 denotes a keyboard controller (KBC) which controls key input from the keyboard 9 and a not-shown pointing device, and numeral 6 denotes a CRT controller (CRTC) which controls display on the CRT display (CRT) 10. Numeral 7 denotes a disk controller (DKC) which controls access to the external memory 11 such as a hard disk (HD), the floppy disk (FD), the CD-ROM or the like storing a boot program, various applications, font data, user files, editing files and the like. Numeral 8 denotes a printer controller (PRTC) which is connected to the printer 1500 through a predetermined bidirectional interface (interface) 21 and executes a communication control process with the printer 1500.

It should be noted that the CPU 1 executes, e.g., an expansion (rasterizing) process of an outline font onto a display information RAM (VRAM) set on the RAM 2, and enables WYSIWYG (what you see is what you get) editing on the CRT 10. Further, the CPU 1 opens various registered windows in response to a command indicated and issued by using a not-shown mouse cursor or the like on the CRT 10, and thus executes various data processes.

Next, the structure of the printer control unit 1000 of the printer 1500 will be explained. In the printer 1500, numeral 12 denotes a printer CPU. The printer CPU 12 collectively controls access to various devices connected to a system bus 15 on the basis of a control program stored in a program ROM 1302 of a ROM 13, a control program stored in an external memory 14 and downloaded to a RAM 19, and outputs an image signal functioning as output information to a print unit (printer engine) 17 connected through an print unit interface (I/F) 16. Incidentally, the control program and the like which are to be executed by the CPU 12 are stored in the program ROM 1302 of ROM 13, and font data and the like which are to be used when the image signal is output to the printer engine 17 are stored in a font ROM 1301 of the ROM 13. In a case where the printer does not use the external memory 14 such as a hard disk or the like, information and the like which are used on the host computer are stored in a data ROM 1303 of the ROM 13.

Like later-described control programs, the programs and the like same as those stored in the ROM 3 may be stored in the ROM 13, and in this case, such the stored programs are transferred to the host computer 3000 as occasion demands. The CPU 12 can perform communication with the host computer 3000 through an input unit (HSTC) 18, and is thus structured to be able to notify the host computer 3000 of the information and the like of the printer 1500.

Numeral 19 denotes the RAM which functions as a main memory, a working area and the like of the CPU 12, and is structured so that its memory capacity can be expanded or extended by an option RAM connected to a not-shown expansion port. The RAM 19 is used as an output information expansion area, an environment data storage area, an NVRAM and the like.

As well as the case of the above host computer 3000, also the control program to be executed by the CPU 12 of the printer 1500 may be downloaded from the external memory 14 to the RAM 19 and then executed.

Access to the external memory 14 such as a hard disk (HD), a CD-ROM, an IC card or the like is controlled by a disk controller (DKC) 20. The external memory 14 is connected as an option and stores font data, emulation programs, form data and the like. Numeral 1501 denotes the operation unit on which the switches for various operations, the LED displays and the like are disposed.

The above external memory 14 is not limited to one, that is, at least one or more external memories may be provided. In other words, the printer 1500 may be structured to be able to connect, in addition to the built-in fonts stored in the font ROM 1301, an option font card and plural external memories respectively storing programs to interpret printer control languages of different language systems. Moreover, a not-shown NVRAM may be provided to store printer mode setting information input from the operation unit 1501.

Next, a tab print process according to the embodiment in the output system having the above structure will be explained.

First, before explanation of the tab print process according to the embodiment, an outline of a conventional tab print process will be explained with reference to FIG. 4.

If a user 404 instructs tab printing 401 to print on a tab paper 402 a document 400 created on the application of the host computer 3000, the created document 400 is transferred to the printer 1500. Then, the printer 1500 judges based on the setting information of the transferred document 400 whether or not this document is to be printed on the tab paper. If the document 400 is to be printed on the tab paper, the document 400 is shifted as a whole by the width of a tab portion. Thus, the document 400 is shifted by the tab width and thus moved on the tab portion, and then the printing to the tab paper 402 is performed.

However, in a case where a character string "Tab 1" is not recorded well on the tab portion of the tab paper 402, the user performs position adjustment 403 to retouch the position of the character string "Tab 1" of the document 400. Here, the user adjusts the position of the character string "Tab 1" as seeing the printed result on the tab paper 402.

As above, it is necessary for the user to perform the printing to the tab paper 402 as repeating the tab printing 401 and the position adjustment 403, and also the area of the contents to be printed on the tab portion is limited.

Figure 5:
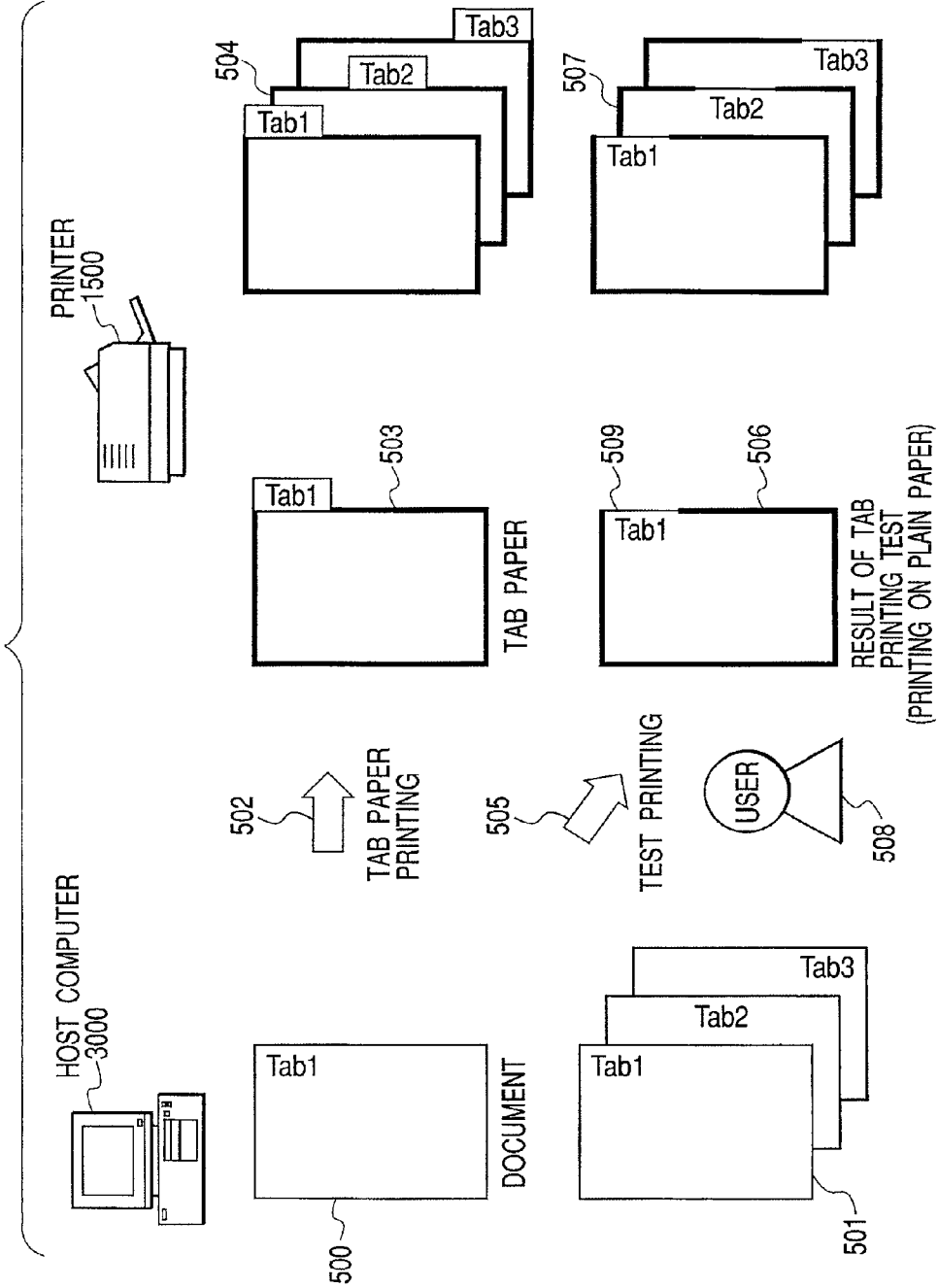
FIG. 5 is a typical diagram for explaining an outline of a tab print process according to the embodiment.

On the contrary, according to the embodiment, as shown in FIG. 5, in a case where a document 500 created by a user 508 is printed on a tab paper 503, a test print mode is added so that the user 508 can easily confirm an area corresponding to a tab position and also confirm a tab print result. Here, it is assumed that tab papers and plain papers are held in paper feed cassettes of the printer 1500.

In a case where the user 508 designates tab paper printing 502 through an UI of a printer driver and thus performs the printing to the tab paper 503, it is possible by further designating test printing through the UI to perform test printing 505 to the plain paper before actually performing the printing to the tab paper. Here, if the test printing 505 is performed in consideration of the direction and the like of the designated paper, as shown by a test print result 506, the test result of the tab printing that an area 509 corresponding to the tab portion is clearly shown is output, whereby the user 508 can judge whether or not the character string "Tab 1" can be printed on the tab portion, by seeing the area 509 corresponding to the tab portion of the test print result 506.

Therefore, the user can easily conform the content of the document to the tab portion only by seeing the area 509 corresponding to the tab portion, whereby costs necessary for the data adjustment and the tab papers can be reduced. Similarly, before a document 501 including plural pages is printed on tab papers 504, the user 508 can obtain a test result 507 by performing the test printing 505 for the document 501.

Next, a setting process in the above tab printing according to the embodiment will be explained with reference to FIG. 6.

Figure 6:
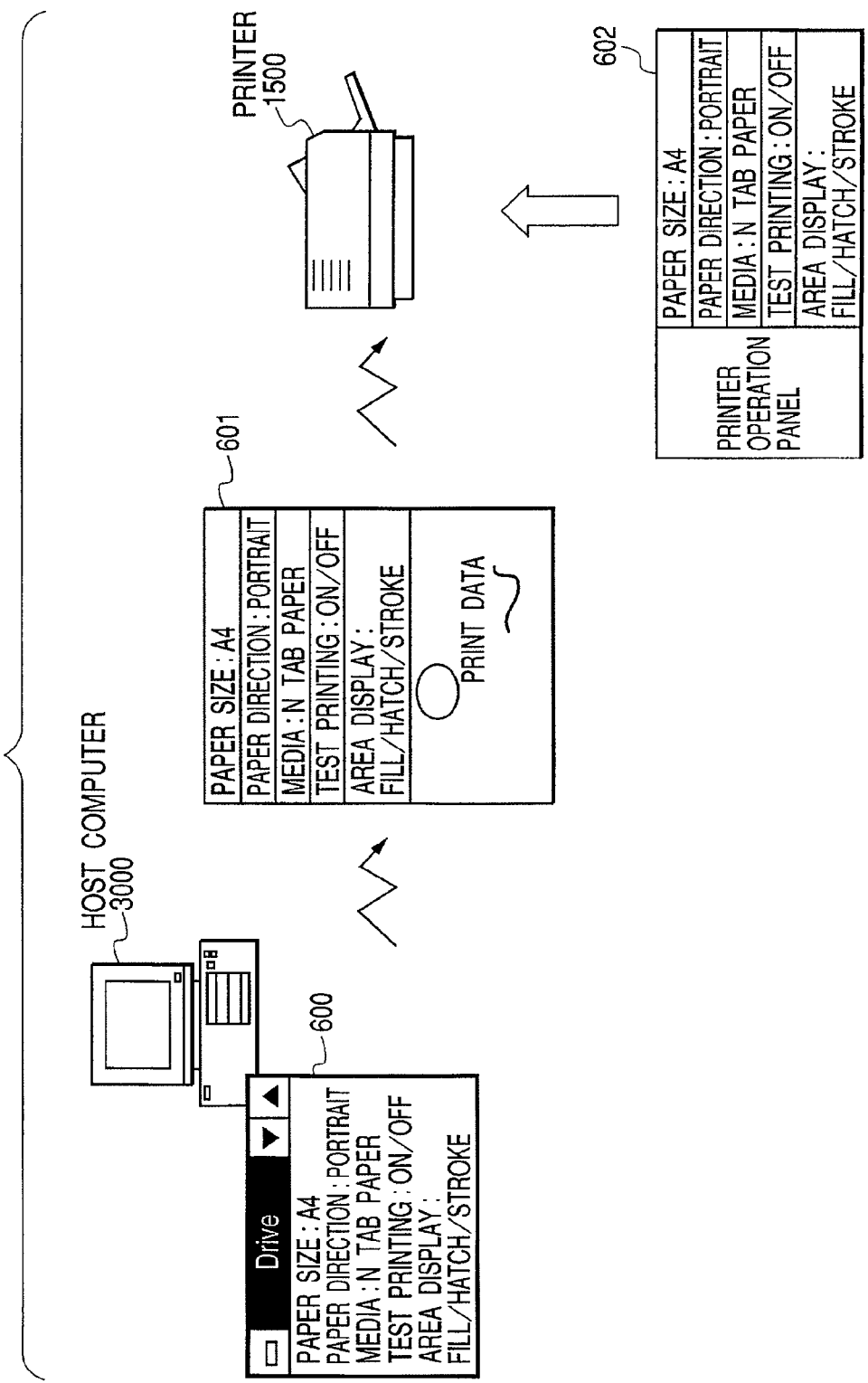
FIG. 6 is a typical diagram for explaining an outline of a setting process according to the embodiment.

As shown in FIG. 6, before printing the document created based on the application of the host computer 3000 on the tab paper set in the paper feed cassette of the printer 1500, the user performs desired setting by using an UI 600 provided by the printer driver. In the embodiment, for example, a paper size is set to "A4", a paper direction is set to "portrait" (longitudinal direction), and a media type is set to "N tab paper". Besides, an item to designate whether or not the test printing to the plain paper is to be performed in the case where the tab paper printing is performed is included in the UI 600, that is, this item of the test printing is set to "OFF" when the test printing to the plain paper is not performed, while this item is set to "ON" when the test printing to the plain paper is performed.

Next, various setting given by the user is added to print data 601 created by the printer driver, and the print data 601 is input to the printer 1500 together with actual drawing data. Then, the printer 1500 which received the print data 601 performs the printing on the tab paper or the plain paper on the basis of the above setting "ON/OFF" of the test printing. For example, in a case where the media type is set to "N tab paper" and the item of the test printing is set to "ON", the printer 1500 judges that the test printing ON has priority, automatically selects the paper feed stage to which the plain papers have been set, and then performs the print output to the plain paper without shifting the image formation position. Besides, in a case where the media type is set to "N tab paper" and the test printing is not designated (in the embodiment, the item of the test printing is set to "OFF"), the printer 1500 considers the designation of the N tab paper set as the media type, automatically selects the paper feed stage to which the N tab papers have been set, and then performs the print output to the N tab paper as shifting the image formation position.

It should be noted that it is possible to set, from the operation unit 1501 of the printer body, the paper size to "A4", the paper direction to "portrait", the media type to "N tab paper", and the test printing to "ON/OFF" (602). Besides, the printer may be structured so that it automatically selects "ON" or "OFF" of the test printing on the basis of a switched result of the paper feed stage and a detection result of a sensor as to the media type.

Next, a tab print process which is executed by the printer control unit 1000 of the printer 1500 on the basis of the above print setting set by the printer driver of the host computer 3000 will be explained.

Figure 7:
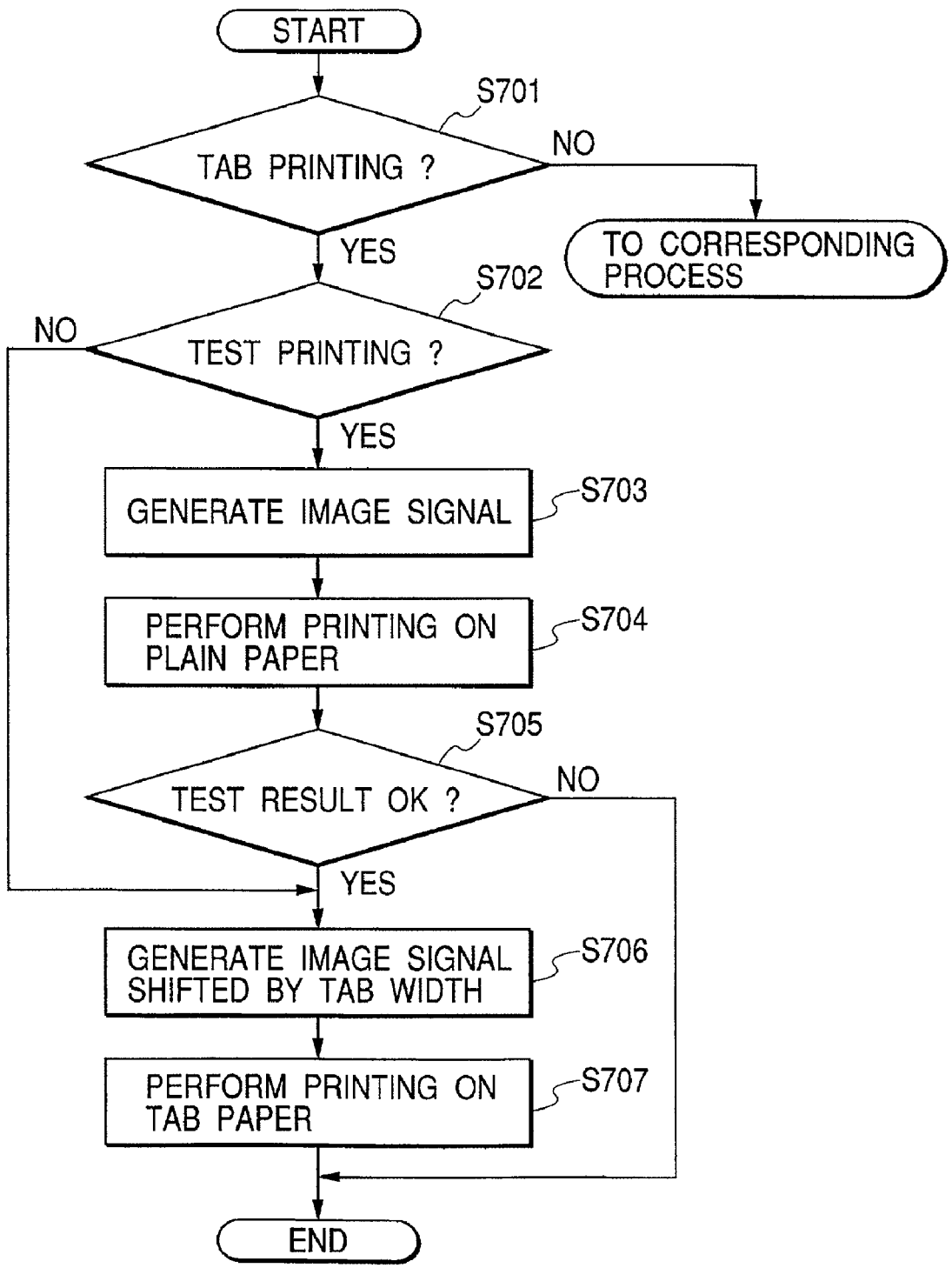
FIG. 7 is a flow chart showing the tab print process according to the embodiment.

FIG. 7 is a flow chart showing the tab print process according to the embodiment. First, in a step S701, the CPU 12 of the printer 1500 refers to the setting of the media type included in the print setting transmitted from the host computer 3000, and thus judges whether or not the tab printing is designated. If the tab printing is not designated, the printer 1500 performs a corresponding print process, while if the tab printing is designated, the process advances to a step S702, and the CPU 12 judges whether or not the test printing in the print setting for the print data is set to "ON". If the test printing is not set to "ON", the process advances to a later-described step S706 to actually perform the printing on the tab paper.

On the other hand, if the test printing is set to "ON", the process advances to a step S703 to generate the image signal to be output to the print unit (printer engine) 17 on the basis of the drawing data sent from the host computer 3000 in accordance with the print control program stored in the program ROM 1302. Here, an image process (e.g., a fill/hatch/stroke process) according to the area display setting in the print setting is performed to the area corresponding to the tab portion so that the user can easily see the test result of the tab printing. Incidentally, in the step S703, the image formation position is not shifted and is thus the same as the normal position. Then, in a step S704, a paper feed instruction is transmitted to the print unit 17 so that the plain paper is fed from the paper feed stage to which the plain papers have been set, and the generated image signal is output to the print unit (printer engine) 17 at predetermined timing through the print unit interface 16, whereby the printing is performed on the plain paper.

Next, in a step S705, if the tab test printing to the plain paper ends, the CPU 12 displays a message "Is test result of tab printing OK?" on, e.g., the operation unit 1501 (display means) to urge the user to confirm whether or not the test result is satisfactory. Then, if key input representing that the test result is not satisfactory is given, the tab printing is not performed as it is, and the process ends. Conversely, if key input representing that the test result is satisfactory is given, the process advances to the step S706 to generate the image signal in which the image formation position has been shifted by the tab width. Then, in a step S707, the paper feed instruction is transmitted to the print unit 17 so that the tab paper is fed from the paper feed stage to which the tab papers have been set, and the generated image signal is output to the print unit (printer engine) 17 at predetermined timing through the print unit interface 16, whereby the printing is actually performed on the tab paper.

Thus, if the test printing is expected when the tab paper printing is performed, it is possible to generate by the information processing apparatus the print data in which the tab paper and the test printing have been designated, analyze the print data by the printer 1500 acting as the print control apparatus, and appropriately control the test printing and the tab paper printing according to the analyzed result. Accordingly, the user may not repeatedly instruct the printing to the tab paper and the correction of the print data on the side of the information processing apparatus acting as the host computer, whereby a significant effect that usability is improved can be obtained.

Further, by retaining not only the designation of the test printing but also the designation of the tab paper in the print data, for example, the print data is stored in the memory box of the print control apparatus. Thus, after the test printing was performed, if it is expected to correctly perform the tab paper printing, since the tab paper has been designated in the already stored print data, the tab paper printing can be achieved even if the print data in which the tab paper has been designated is not re-transmitted from the host computer.

Furthermore, in the case where the test printing is performed, a decoration process is performed to the drawing content at the tab position where the image formation position is not shifted, whereby it is possible to easily discriminate the area corresponding to the tab position of the tab paper.

Here, the control of the media type is supplemented. If the relation of the media detection by the sensor, the media type and a paper supply port is managed by the printer 1500, the control to feed the plain paper media only has to be performed in the case where the test printing is set to "ON". For example, in a case where the print data 601 in which the paper size, the paper direction, the media type and the test printing have been set respectively to "A4", "portrait", "N tab paper" and "ON" is input, the process is started as the test printing in the condition of the paper size "A4", the paper direction "portrait" and the media type "plain paper". If the printer 1500 is intelligent, this method is desirable.

Even in a case where the printer 1500 does not detect a media type, the switch control of the plain paper and the tab paper can be achieved in a method that a print operation is once stopped if the test printing is set to "ON", a message is displayed to urge the user to select a paper feed port from the operation unit 1501 on the printer body, and then a job is re-started.

Besides, the switch control of a print job and the test printing is supplemented.

As described above, the test printing and the printing to the tab paper are switched on the basis of the parameters ON/OFF of the test printing. Here, timing and direction of the switching of the parameters ON/OFF may be changed, and it is possible to think about this change as well as the embodiment. The following is an example of the above switching:

the job of the test printing ends, and the printing ends;
since the tab paper printing is tried but can not be performed well, then the job of the test printing is continued to perform the printing in the test printing; and
the job of the test printing is stored in the memory of the body, and after then, the printing can be correctly performed if the stored (test) job is executed, whereby the printing is again changed to the tab paper printing and executed when the data is took out.

Incidentally, if the specification capable of explicitly designating a continuous operation to the printer is given, the parameter forms may be continuously mentioned as ON, OFF (ON to OFF).

Figure 4:
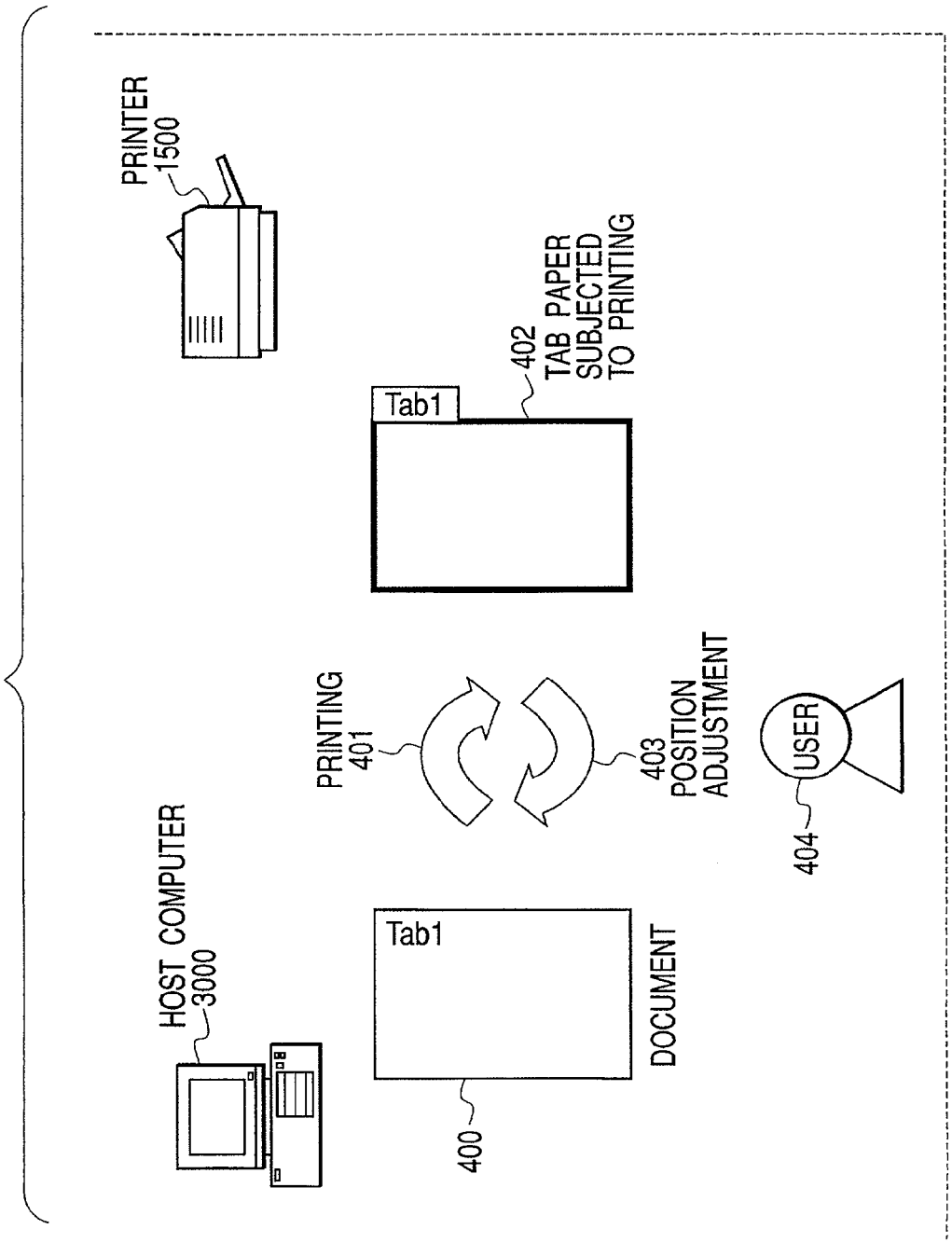
FIG. 4 is a typical diagram for explaining an outline of a conventional tab print process.

In case of the conventional tab printing as shown in FIG. 4, the user confirms whether or not the document has been created well from the print result actually printed on the tab paper. However, in case of the tab printing according to the embodiment as shown in FIG. 6, the user can judge whether or not the document has been created well from the printing on the plain paper. Here, if the excellent result can be obtained in the test printing, the printing to the tab paper normally ends, whereby the tab paper is not uselessly consumed.

Incidentally, if the plain paper to which marking in its paper feed direction has been performed is set in the paper feed cassette and the document of which the content is blank is printed, only the tab position is printed on the paper. Thus, if the user sets the tab paper so as to coincide with the paper on which only the tab position has been printed, it is not necessary so much for the user to recognize the paper feed direction and the number of tabs.

Next, an application example of the tab printing according to the embodiment will be explained with reference to FIG. 8.

Figure 8:
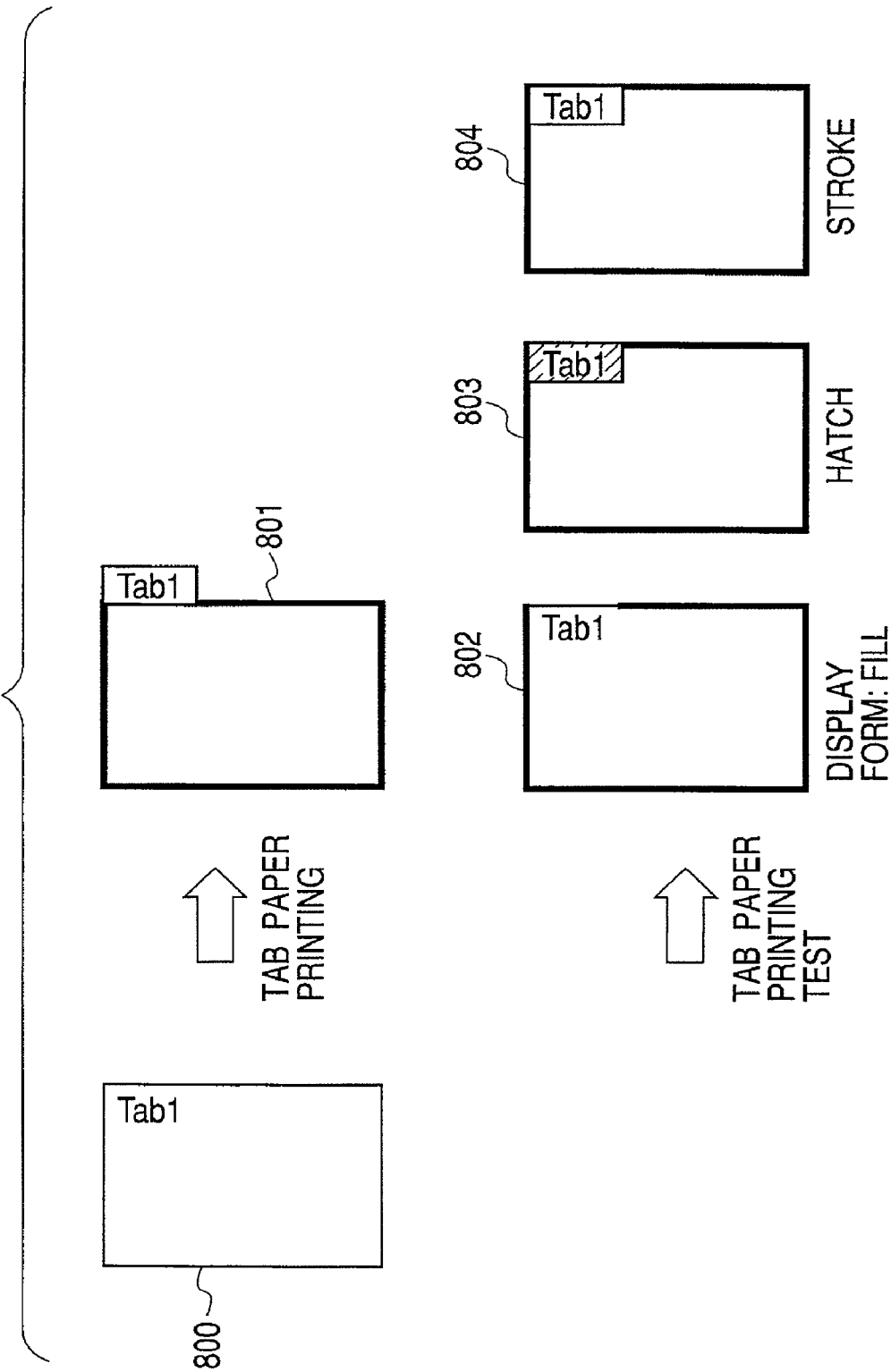
FIG. 8 is a typical diagram for explaining an application example of tab printing according to the embodiment.

FIG. 8 is the diagram showing a switch function of decoration forms in the test printing. Numeral 801 shows an example of the output result obtained when the tab paper printing is designated. In a case where a document 800 is subjected to the test printing, if setting of a display form is switched respectively to, e.g., fill, hatch and stroke forms, the print results respectively indicated by numerals 802, 803 and 804 can be obtained. By the above switch function of the decoration forms, it is possible to easily discriminate the print result even if the result of the test printing is difficult to be discriminated according to the contents actually printed on the tab portion.

In the example of FIG. 5, the test printing in the case where the portion corresponding to the tab print area changes is shown, but the present invention is also applicable to a case where the portion corresponding to the tab print area is fixed.

As explained above, according to the embodiment, the user need not be conscious of the tab width and the paper feed direction.

Further, the user need not be conscious of the physical areas such as the number of tabs, the tab position, the height of the tab width, and the like which are respectively various according to the kind of tab paper.

Furthermore, the user need not repeat the (test) printing to the tab paper and the corrections of the documents.

Furthermore, the tab paper is not uselessly consumed.

In the embodiment described above, the process that the printer 1500 analyzes the print data and then switches the tab paper printing and the test printing according to the analyzed result is explained. Meanwhile, in the next embodiment, a mechanism by which the same effect as above can be obtained even if the printer 1500 does not perform the complicated control (the control flow shown in FIG. 7) of analyzing the print data and then switching the process when the designation of the tab paper printing and the designation of the test printing overlap each other will be explained. In this case, it should be noted that the process which has been explained so far is performed by the printer driver on the side of the host computer. Then, the process of the printer driver will be explained with reference to FIGS. 13 to 16.

Figure 13:
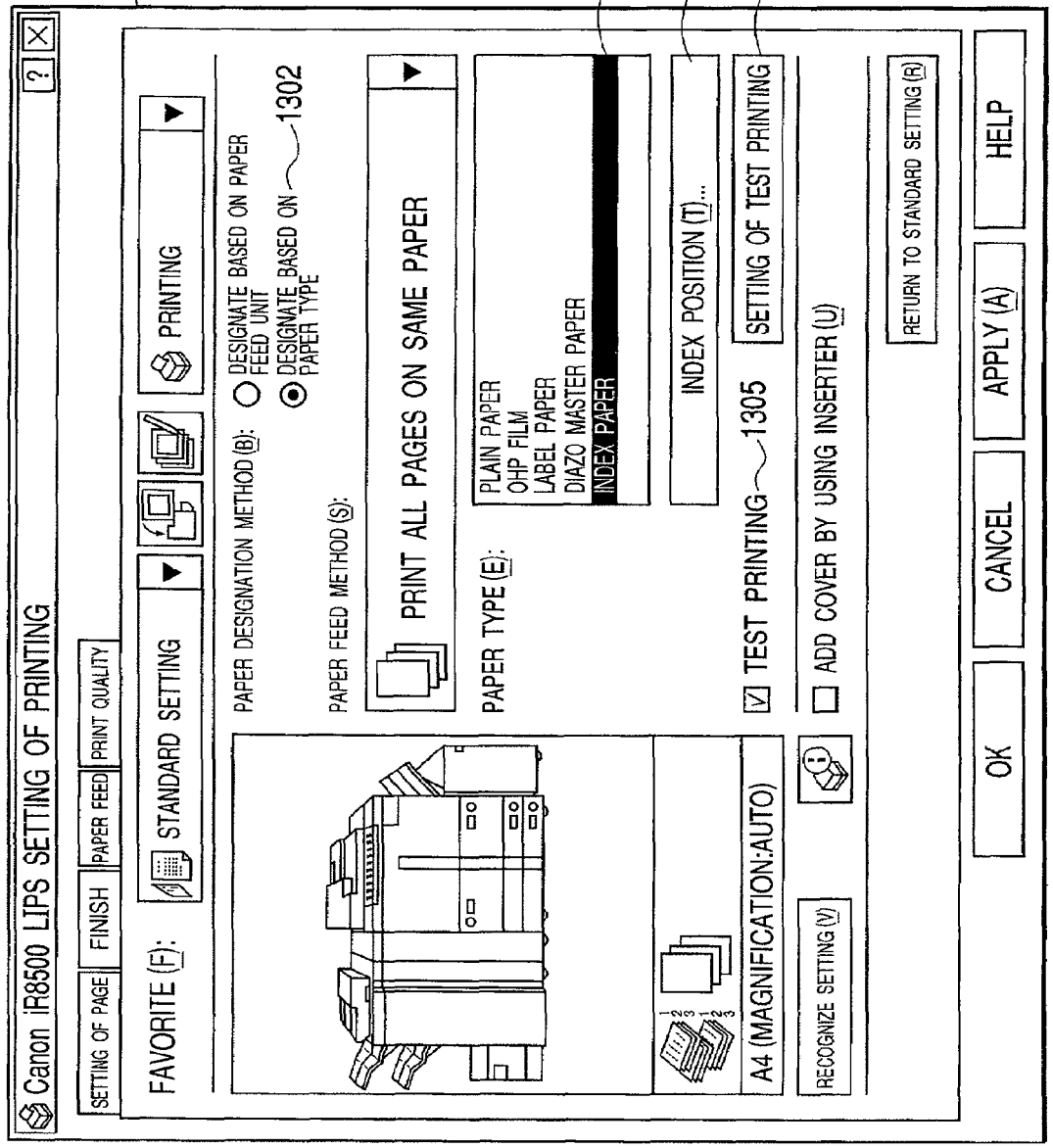
FIG. 13 is a view showing specifications of a user interface (UI) of a printer driver.

FIG. 13 is a view for explaining a user interface (UI) 1301 of the printer driver (i.e., the print control program of the present invention) to be executed by the information processing apparatus 3000.

In the UI 1301 of the printer driver of FIG. 13, numeral 1302 denotes a button for determining, as a paper designation method, to designate the paper based on a paper type (i.e., media type). By depressing the paper type designation button 1302, a paper type selection section 1303 is displayed. If the tab paper (also called an index paper) is selected in the paper type selection section 1303, an index position designation button 1304 for designating an index position and a check box 1305 for instructing or indicating the test printing are activated (enabled). Further, if the check box 1305 is checked, a test print setting button 1306 for performing the detailed setting of the test printing is activated.

Thus, the user can designate the tab printing as the media type and designate the test printing, by using the UI of the printer driver as above.

Figure 14:
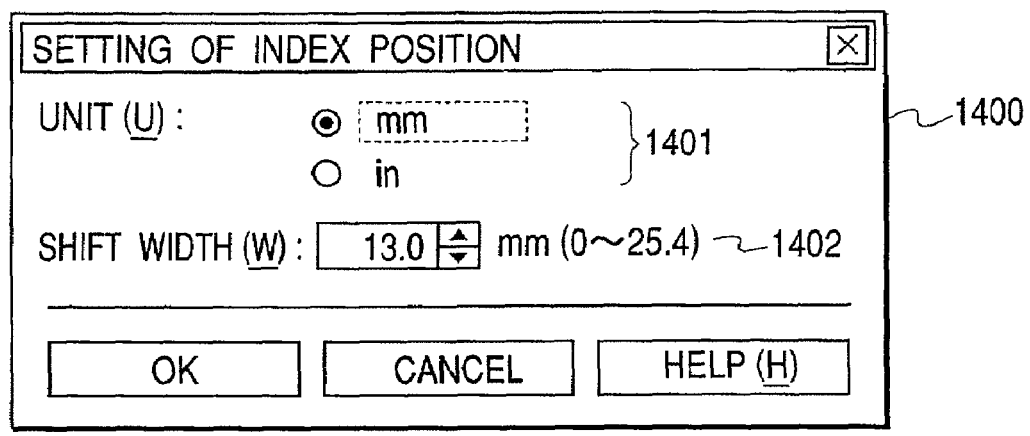
FIG. 14 is a view showing an example of a dialog-box screen for setting an index position, which is displayed and instructed by the printer driver.

FIG. 14 is a view showing an example of a dialog-box screen which is displayed and controlled when the index position designation button 1304 is depressed.

In an index position setting dialog box 1400 of FIG. 14, numeral 1401 denotes radio buttons for designating a unit of designating the shift width when the image formation position is shifted in the printer 1500 in case of performing the tab paper printing. The shift width in the embodiment can be designated in the unit of millimeter or inch. Numeral 1402 indicates an area for numerically designating the shift width when the image formation position is shifted in the printer 1500. The default of the shift width 1402 is 13 millimeters. The setting of the index position set in the screen of FIG. 14 is reflected on tab information of the print data.

Figure 15:
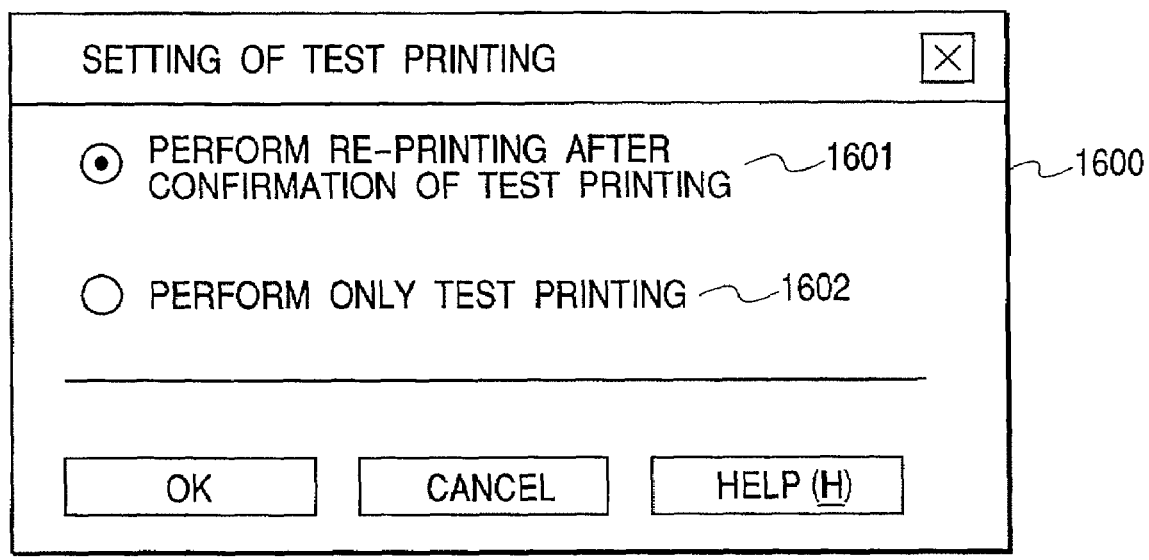
FIG. 15 is a view showing an example of a dialog-box screen for setting in detail test printing, which is displayed and instructed by the printer driver.

FIG. 15 is a view showing an example of the dialog-box screen which is displayed and controlled when the test print setting button 1306 is depressed.

In a test print setting dialog box 1600 shown in FIG. 15, numeral 1601 denotes a radio button for designating to print the image of which the image formation position is shifted on the tab paper after the test printing was confirmed, numeral 1602 denotes a radio button for designating to perform only the test printing, and the radio buttons 1601 and 1602 are selected in an alternative way. As described later, the operation of the print process in the printer driver changes in accordance with the test printing setting of FIG. 15.

Figure 16:
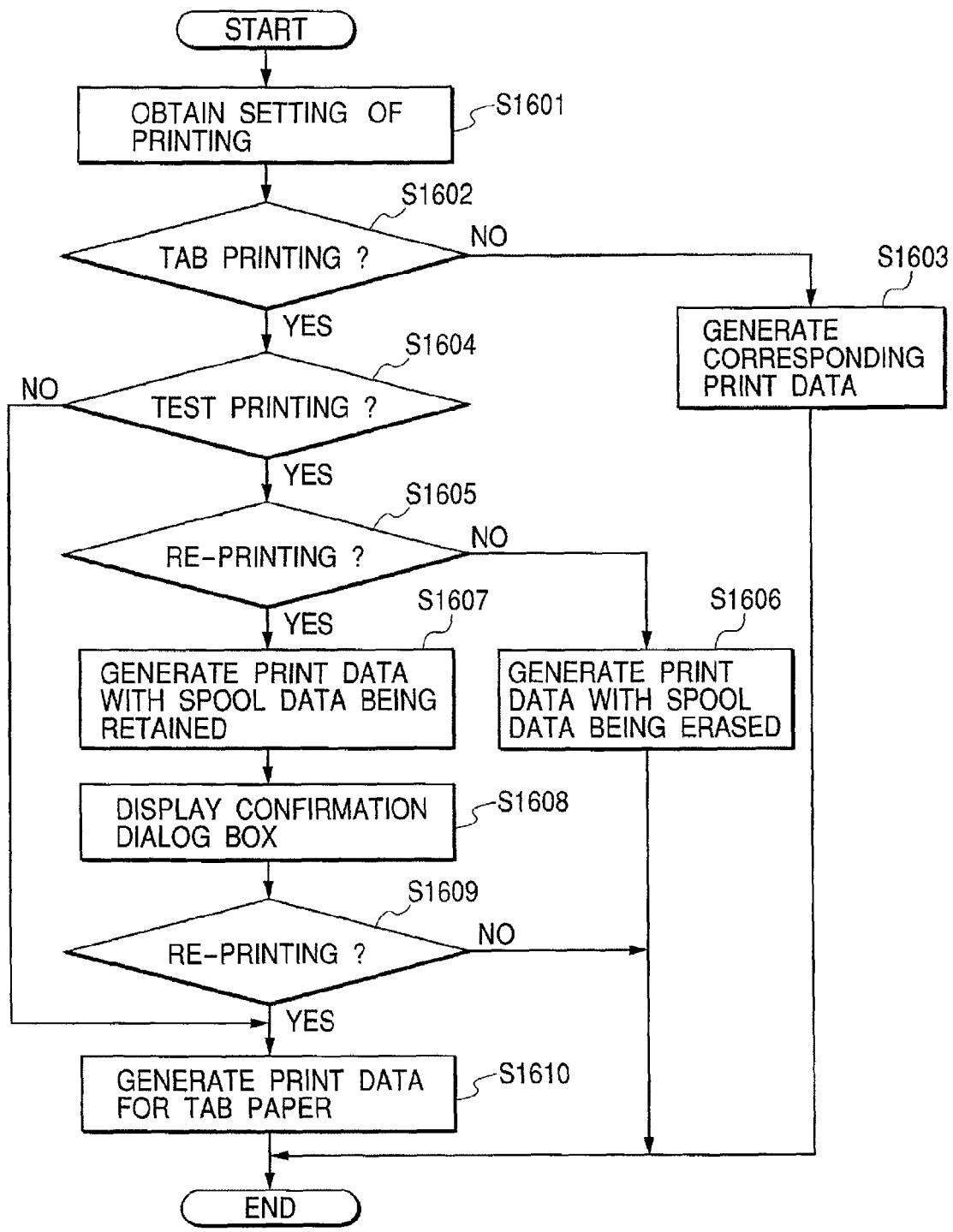
FIG. 16 is a flow chart for explaining a control flow of the information processing apparatus according to the present invention.

FIG. 16 is a flow chart for explaining a control process of the information processing apparatus based on a printer driver program according to the present invention. This control process starts when printing of document data generated based on an arbitrary application is instructed.

In a step S1601, the printer driver obtains the print setting set by the user through the UI. This print setting is managed by a DEVMODE structure provided by the OS, and the printer driver can obtain the print setting by using an application program interface (API).

In a step S1602, the printer driver judges whether or not the tab paper printing is designated, by referring to the obtained print setting. Then, in a case where the index paper is designated in the paper type selection section 1303 of FIG. 13, it is judged that the tab paper printing is designated. If the tab paper printing is designated, the process advances to a step S1604, while if the tab paper printing is not designated, the printer driver generates the corresponding print data in a step S1603, and then the process ends.

In the step S1604, the printer driver further judges whether or not the test printing is designated, by referring to the obtained print setting. Then, in a case where the test print check box 1305 of FIG. 13 is checked, it is judged that the test printing is designated. If the test printing is designated, the process advances to a step S1605, while if the test printing is not designated, the process advances to a step S1610.

In the step S1605, the printer driver judges whether or not it is designated to perform the re-printing of the tab paper printing after the confirmation of the test printing, by referring to the setting of the test print setting dialog box (FIG. 15). If the re-printing is designated, the process advances to a step S1607, while if the re-printing is not designated, the process advances to a step S1606.

In the step S1606, the printer driver receives as a drawing function the document data generated based on the application through a drawing means (generally called GDI (Graphical Device Interface)) of the OS, and spools the received drawing function as intermediate data (called spool data). Then, the printer driver sequentially performs PDL conversion of the spool data to generate the print data. If the print data is generated, the spool data is erased, and then the process ends.

On the other hand, if the re-printing of the tab paper printing is designated, in the step S1607, the printer driver spools as the intermediate data the drawing function received from the GDI being the drawing means of the OS, and performs the PDL generation with the spool data being retained, whereby the print data is generated. Here, the generated print data corresponds to normal print data to which as the media type the designation of "plain paper" is selected, and which does not include any tab paper information such as a shift width and the like. Then, the printer driver transfers the generated print data to a print spooler of the OS to perform an output process of the print data. If the print data is output to the printer, in a step S1608, the printer driver issues a display instruction to the OS to display a dialog-box screen shown in FIG. 17.

Figure 17:
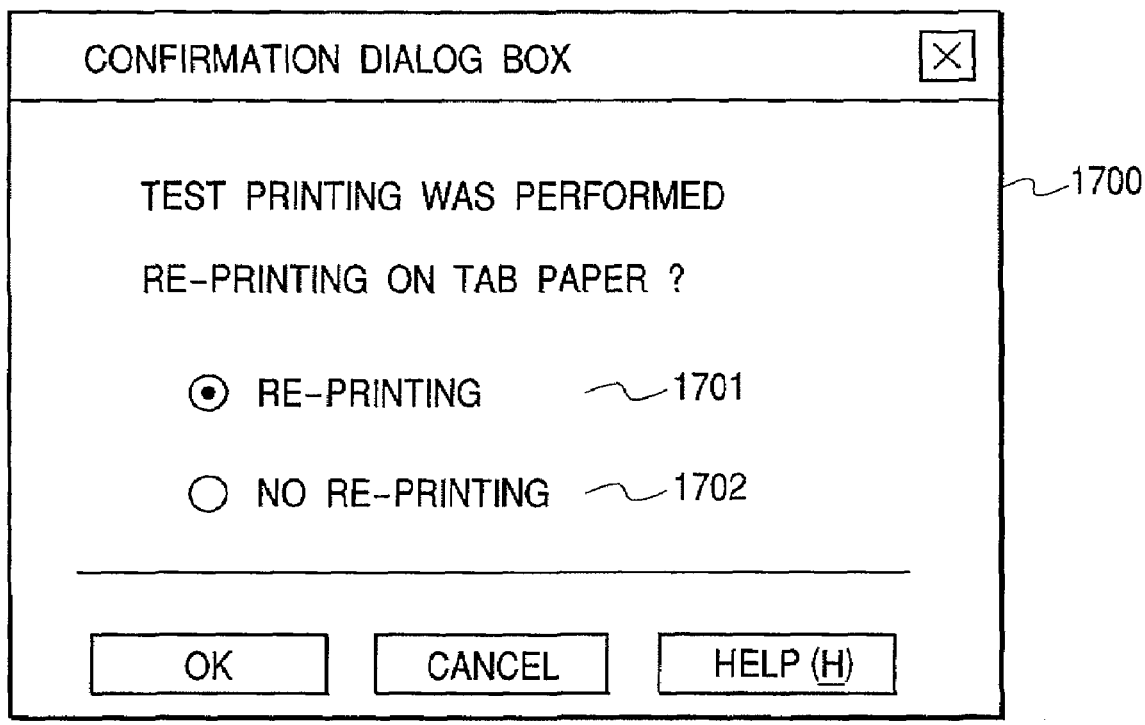
FIG. 17 is a view showing an example of a confirmation dialog-box screen which is displayed on the information processing apparatus when the test printing is performed.

FIG. 17 shows a dialog-box screen 1700 for inquiring of the user about the printed result of the test printing. In FIG. 17, numeral 1701 denotes a radio button for designating to cause the printer to perform the print process, in which the image formation position has been shifted, to the tab paper, and numeral 1702 denotes a radio button for designating to end the process without performing the tab paper printing. Here, it is assumed that the radio buttons 1701 and 1702 are selected in an alternative way. If an OK button is depressed in the state that the radio button 1701 of re-printing of FIG. 17 is being checked, in a step S1609, the printer driver considers that the re-printing is designated, and the process advances to the step S1610. On the other hand, if the OK button is depressed in the state that the radio button 1702 of no re-printing of FIG. 17 is being checked, in the step S1609, the printer driver considers that the re-printing is not designated, and the process ends.

In the step S1610, the printer driver generates the print data for the tab paper printing from the spool data, transfers the generated print data to the print spooler of the OS, and then performs the print output process. Here, since the tab paper is designated as the media type for the generated print data, the data includes the tab paper information such as the shift width and the like. If the print output process in the step S1610 ends, it is considered that the print process ends as a whole, whereby the process of the printer driver ends.

Thus, in the case where the tab paper printing is designated and the test printing is designated, the printer driver generates the print data to which the plain paper is designated as the media type. On the other hand, in the case where the tab paper printing is designated and the test printing is not designated, the printer driver generates the print data to which the tab paper is designated as the media type, whereby the printer 1500 only has to perform the print control according to the designation in the received print data. Therefore, as in the above first embodiment, it is unnecessary on the side of the printer 1500 to perform the complicated control of appropriately discriminating the designation of the tab paper and the designation of the test printing and then switching or changing the process according to the discriminated result, whereby it is possible to decrease loads in development processes of the printer and achieve reduction in costs of the printer 1500.

Moreover, in the case where the tab paper printing is designated, the test printing is designated, and the tab paper printing is performed after the test printing ended, then the spool data used to generate the print data when the test printing is performed is retained within the information processing apparatus, and then, when the re-printing is performed, the print data for the tab paper is generated by using the retained spool data. Thus, the print instruction from the application may be issued only once, and the result desired by the user can be obtained, whereby it is possible to provide the system of which the usability is satisfactory for the user.

Another Embodiment

Next, another embodiment of the present invention will be explained in detail with reference to the attached drawings.

In the above first embodiment, the laser beam printer was explained as the printer by way of example. On the other hand, in another embodiment, a case where the present invention is applied to a printer of ink-jet type will be explained by way of example.

Figure 9:
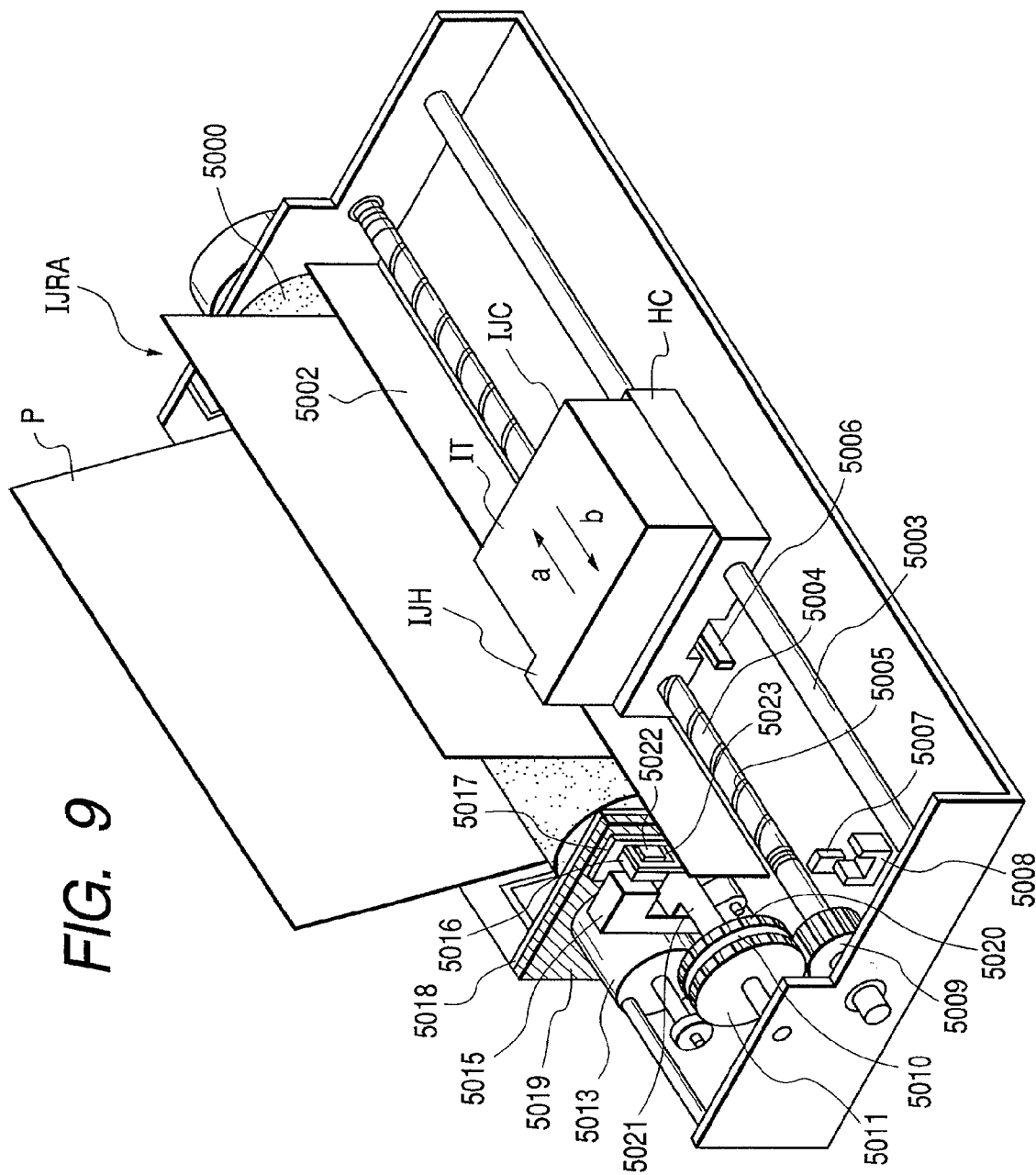
FIG. 9 is a view showing a structure of an ink-jet printer (IJRA) according to another embodiment.

FIG. 9 is a view showing the structure of the ink-jet printer (IJRA) according to another embodiment.

A carriage HC which is engaged with a screw groove 5004 of a lead screw 5005 rotating in synchronism with forward and reverse rotation of a driving motor 5013 through driving force transmission gears 5010, 5011 and 5009 includes a pin (not shown) and is reciprocated in directions a and b along a shaft 5003. The carriage HC is equipped with an ink-jet cartridge IJC which includes an ink-jet head IJH and an ink tank IT. Numeral 5002 denotes a paper push plate which pushes a paper P toward a platen 5000 along the carriage shift direction, and numerals 5007 and 5008 denote a photocoupler which functions as a home position detection means for confirming presence of a carriage lever 5006 in such a photocoupler area, and changing the rotation direction of the driving motor 5013. Numeral 5016 denotes a member which supports a cap member 5022 for capping the whole surface of a recording head, and numeral 5015 denotes a suction means which sucks the inside of the cap. The suction means 5015 performs suction recovery of the recording head through an intracap opening 5023. Numeral 5017 denotes a cleaning blade which can be shifted forward and backward by a member 5019, and numeral 5018 denotes a body support plate which supports the cleaning blade 5017 and the member 5019. Numeral 5021 denotes a lever which is to start the suction in the suction recovery operation. The lever 5021 is moved according to movement of a cam 5020 engaged with the carriage, and the movement of the lever 5021 is controlled by the driving force from the driving motor 5013 through a known transmission means such as a clutch or the like.

Incidentally, the printer is structured so that, in the capping, the cleaning and the suction recovery, the desired process can be performed at the corresponding positions by the operation of the lead screw 5005 when the carriage HC reaches the area on the home position side. However, the printer only has to be structured so that the desired operation is performed at known timing.

Figure 10:
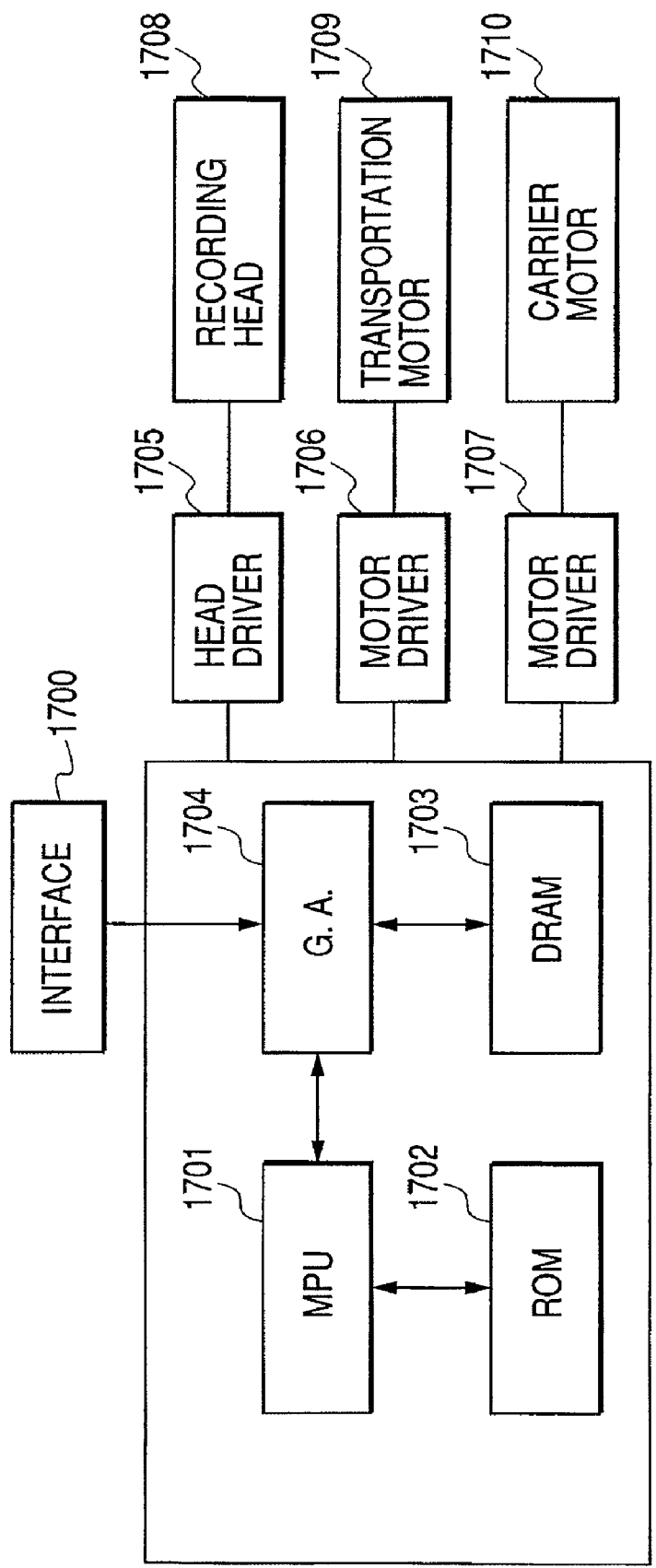
FIG. 10 is a block diagram showing a control system of the ink-jet printer shown in FIG. 9.

FIG. 10 is a block diagram showing a control system of the ink-jet printer of FIG. 9. In FIG. 10, numeral 1700 denotes an interface through which a recording signal is input from the information processing apparatus (host computer) 3000 of FIG. 2. Numeral 1701 denotes a micro processing unit (MPU) which controls the printer as a whole, numeral 1702 denotes a ROM which stores control programs, host print information and the like to be executed by the MPU 1701, and numeral 1703 denotes a DRAM which stores various data (i.e., recording signals, recording data to be supplied to a recording head, and the like).

Numeral 1704 denotes a gate array (G.A.) which controls the data to be supplied to a recording head 1708. The G.A. 1704 also controls the data to be transferred among the interface 1700, the MPU 1701 and the DRAM 1703. Numeral 1710 denotes a carrier motor which is to carry the recording head 1708, numeral 1709 denotes a transportation motor which is to transport the recording paper, numeral 1705 denotes a head driver which drives the recording head 1708, numeral 1706 denotes a motor driver which drives the transportation motor 1709, and numeral 1707 denotes a motor driver which drives the carrier motor 1710.

In the ink-jet printer structured as above, if input information is input from the host computer 3000 through the interface 1700, the input information is converted into output information for the printing between the G.A. 1704 and the MPU 1701. Then, the motor drivers 1706 and 1707 are driven, and also the recording head 1708 is driven according to the output information sent to the head driver 1705, whereby the printing is performed.

It should be noted that the MPU 1701 can communicate with the host computer 3000 through the interface 1700, whereby memory information concerning the DRAM 1703, resource data, the host print information in the ROM 1702, and the like can be notified to the host computer 3000.

Figure 11:
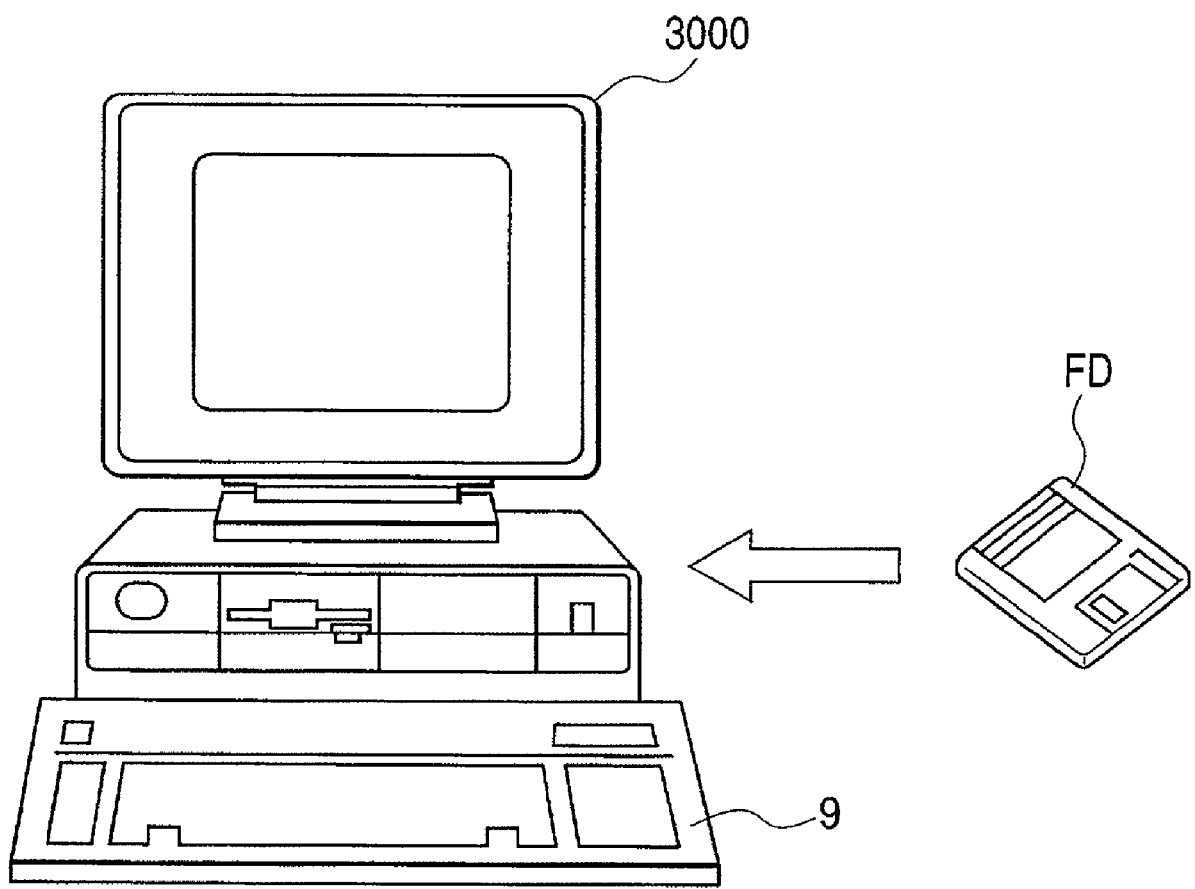
FIG. 11 is a view showing a state that a control program of the embodiment is downloaded to the host computer 3000.

FIG. 11 is a view showing a state that a floppy disk (FD: storage medium) functioning as an external memory is inserted into the host computer 3000 of the embodiment and a program stored in the inserted FD is loaded to the host computer 3000. Here, in FIG. 11, the FD is shown by way of example, however, it is needless to say that a CD-ROM, a DVD or the like may be used as the external memory.

Figure 12:
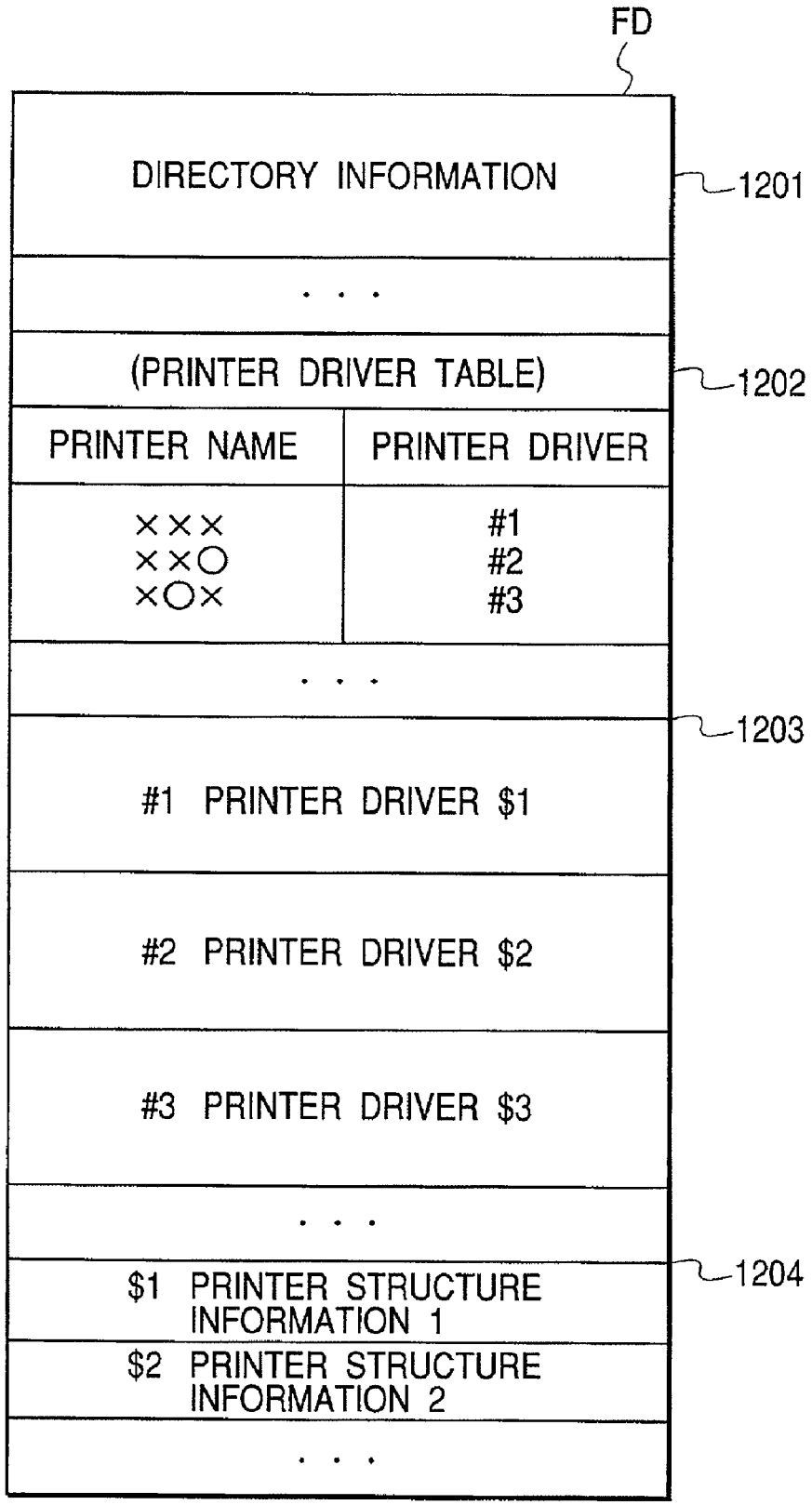
FIG. 12 is a view showing a memory map of an floppy disk (FD) which is an example of a storage medium of FIG. 11.

FIG. 12 is a view showing a memory map of the FD being the example of the storage medium shown in FIG. 11. In FIG. 12, numeral 1201 denotes an area in which directory information is stored, and this directory information indicates a memory location of a following printer driver table 1202. Further, the directory information indicates memory locations corresponding to each printer and each printer driver, for example, a memory location 1203 of the program or the like for controlling the printer shown in FIG. 1 or 9, a memory location 1204 of structure information 1 of the printer in question, and the like. If the operator of the host computer 3000 indicates a desired printer name intended to be installed from the stored contents of the FD by using the keyboard (KB) 9, the printer driver is loaded to the host computer 3000 by referring to the above printer driver table 1202. For example, if a printer name "XXX" is indicated, the program and the structure information stored in the areas 1203 and 1204 can be loaded into the host computer 3000. Incidentally, the present invention is applicable to a system composed of plural equipments (e.g., a host computer, interface equipment, a reader, a printer, and the like) or to an apparatus including a single equipment (e.g., a copying machine, a fax machine or the like).

It is needless to say that the object of the present invention can be achieved in a case where a storage medium storing program codes of software for realizing the functions of the above embodiments is supplied to a system or an apparatus and then a computer (CPU or MPU) in the system or the apparatus reads and executes the program codes stored in the memory medium.

In this case, the program codes themselves read from the storage medium realize the functions of the above embodiments, and thus the storage medium storing the program codes constitutes the present invention.

As the storage medium from which the program codes are supplied, for example, a floppy disk, a hard disk, an optical disk, a magnetooptical disk, a CD-ROM, a CD-R, a magnetic tape, a non-volatile memory card, a ROM or the like can be used.

Further, it is needless to say that the present invention includes not only the case where the functions of the above embodiments are realized by the execution of the program codes read by the computer, but also a case where an OS (operating system) or the like running on the computer executes a part or all of the actual process on the basis of the instructions of the program codes, and the functions of the above embodiments are realized by such process.

Furthermore, it is needless to say that the present invention includes a case where, after the program codes read from the storage medium were once written in a memory provided in a function expansion board inserted in the computer or a function expansion unit connected to the computer, a CPU or the like provided in the function expansion board or the function expansion unit executes a part or all of the actual process on the basis of the instructions of the program codes, and the functions of the above embodiments are realized by such process.

As many apparently widely different embodiments of the present invention can be made without departing from the spirit and scope thereof, it is to be understood that the invention is not limited to the specific embodiments thereof except as defined in the appended claims.

As explained above, according to the print control apparatus of the present invention, the print control to the tab paper can be performed from the held print data after the test printing was performed, whereby the printing to the tab paper and the correction of the print data need not be repeated.

Further, according to the information processing apparatus of the present invention, the print control to the tab paper can be performed from the held print data after the test printing was performed, whereby the printing to the tab paper and the correction of the print data need not be repeated.

Furthermore, according to the information processing apparatus of the present invention, the print data to which the plain paper is designated as the media type in the test printing and the tab paper is designated as the media type in the tab paper printing is generated, whereby it is possible to provide the mechanism by which the tab paper print process in which the test printing desired by the user has been performed is performed even for a conventional print device.

Furthermore, according to the present invention, it is possible to provide the mechanism by which the print data is stored in the memory box of the print control apparatus, and the tab paper printing is correctly performed after the test printing was performed.

Furthermore, according to the present invention, it is possible to provide the mechanism by which the test printing can be performed so that the area corresponding to the tab position of the tab paper is discriminable.

Furthermore, according to the present invention, in the case where the printing to the tab paper is performed after the test printing was performed, it is possible to provide the mechanism by which the loads of user's operations can be decreased and the desired printed result can be obtained with simple operation.

What is claimed is:

1. An information processing apparatus for generating print data to be transmitted to a print control apparatus having a printer engine that prints using a tab paper, comprising:
    a designation unit constructed to designate (a) the tab paper as a media type used for printing and (b) test printing;
    a first displaying control unit constructed to display a designation screen to designate performing tab paper printing after the test printing, in a case where the test printing is designated by said designation unit;
    a test data generation unit constructed to generate print data for printing using a print media different from the tab paper, in a case where the tab paper is designated as a print output setting and the test printing is designated by said obtaining designation unit;
    a hold unit constructed to hold intermediate print data for the tab paper printing in a memory of the information processing apparatus in a case where a designation for performing of the tab paper printing is received via the displayed designation screen after the test printing;
    a second displaying control unit constructed to display to an operator a confirmation screen for confirming that the tab paper printing is to be performed after the test printing is performed in the print control apparatus; and
    a tab paper data generation unit constructed to generate print data for printing using the tab paper designated as the print output setting based on the intermediate print data held in the memory by said hold unit, in a case where the performing of the tab paper printing is received via the confirmation screen displayed by said second displaying control unit.

2. A method performed by an information processing apparatus of generating print data to be transmitted to a print control apparatus that prints using a tab paper, the method comprising:
    a designation step of designating a (a) the tab paper as a media type used for printing and (b) test printing;
    a first display controlling step of displaying a designation screen to designate performing tab paper printing after the test printing, in a case where the test printing is designated in said designation step;
    a test data generation step of generating print data for printing a print media different from the tab paper, in a case where the tab paper is designated as a print output setting and the test printing is designated in said designation step;
    a hold step of holding intermediate print data for the tab paper printing in a memory of the information processing apparatus in a case where a designation for performing of the tab paper printing is received via the displayed designation screen after the test printing;
    a second display controlling step of displaying to an operator a confirmation screen for confirming that the tab paper printing is to be performed after the test printing is performed in the print control apparatus; and
    a tab paper data generation step of generating the print data for printing using the tab paper designated as the print output setting based on the intermediate print data held in the memory in said hold step, in a case where the performing of the tab paper printing is received via the confirmation screen displayed in said second displaying control step.

3. A tangible computer-readable storage medium storing a computer-executable program for a method performed by an information processing apparatus of generating print data to be transmitted to a print control apparatus having a printer engine that prints using a tab paper, the method comprising:
    a designation step of designating (a) the tab paper as a media type used for printing and (b) test printing;
    a first display controlling step of displaying a designation screen to designate performing tab paper printing after the test printing, in a case where the test printing is designated in said designation step;
    a test data generation step of generating print data for printing a print media different from the tab paper, in a case where the tab paper is designated as a print output setting and the test printing is designated in said designation step;

a hold step of holding intermediate print data for the tab paper printing in a memory of the information processing apparatus in a case where a designation for performing of the tab paper printing is received via the displayed designation screen after the test printing;

a second display controlling step of displaying to an operator a confirmation screen for confirming that the tab paper printing is to be performed after the test printing is performed in the print control apparatus; and a tab paper data generation step of generating print data for printing using the tab paper designated as the print output setting based on the intermediate print data held in the memory by said hold step, in a case where the performing of the tab paper printing is received via the confirmation screen displayed by said second displaying control step.

* * * * *